Jan. 1, 1924.
J. B. ENTZ
1,479,463
ELECTRIC BRAKE
Filed Nov. 5, 1920
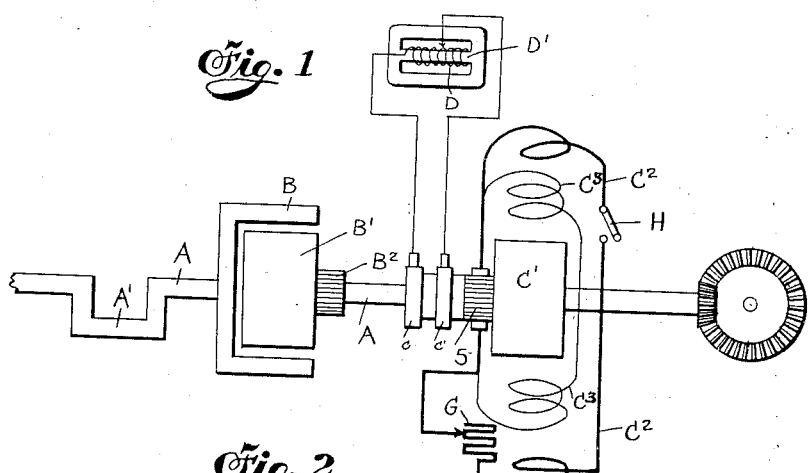
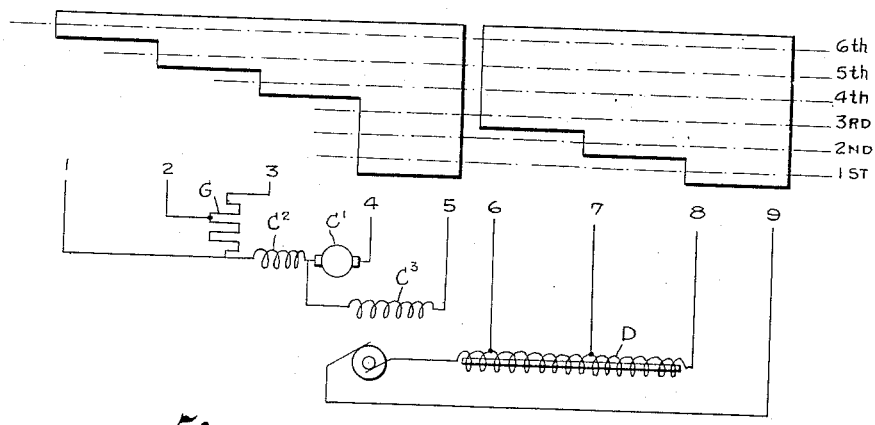
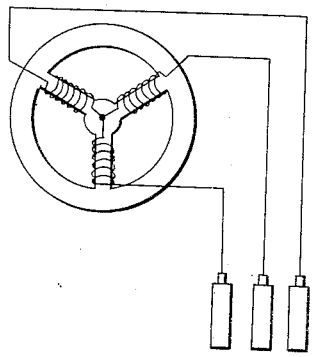
Justus B Entz Inventor
By Attorneys
Emery Varney Blair & Noguet Patented Jan. 1, 1924.

1,479,463

UNITED STATES PATENT OFFICE.

JUSTUS B. ENTZ, OF NEW YORK, N. Y.

ELECTRIC BRAKE.

Application filed November 5, 1920. Serial No. 421,990.

*To all whom it may concern:*

Be it known that I, JUSTUS B. ENTZ, a citizen of the United States, residing in the city, county, and State of New York, have invented an Improvement in Electric Brakes, of which the following is a specification.

My present invention relates to braking apparatus and has for an object to provide an improved electric brake more particularly adapted for power driven vehicles.

The invention is capable of general use but is especially useful in connection with arrangements of electro-magnetic transmission between a gas engine and a vehicle which it drives. The braking apparatus which I use is electric and is best embodied in a transmission of the character described, in which the different combinations between two dynamo-electric machines which may at different times be operated as motors or generators, or one of each, are employed to get a graduated transmission varying by the incremental method rather than by abrupt steps, as does the mechanical gear-shift. As already indicated, it may be employed in other relations and, so far as I know, is new in all relations.

In carrying out the invention I employ a continuous-current generator, the armature circuit of which is closed through a resistance. At relatively high speeds its braking current is large and of substantially high potential and gives difficulties of commutation from excessive sparking and a liability to occasional flash-overs. Thus while a given dynamo electric machine may in a vehicle be entirely adequate for the purpose of acceleration, the rates of retardation desired are usually much higher than the rates of acceleration and therefore the current output of the machine when in braking is much greater than the current input into the same machine when used to accelerate the vehicle; and consequently commutation difficulties will arise when braking which would be absent when accelerating. I have arranged my braking devices so that these difficulties are to a great extent overcome. One feature of the invention is connecting points in the winding of the armature to a number of collector rings upon the shaft, two or more, so that the armature generates and transmits to these collecting devices alternating current, either single phase or polyphase as may be desired. I employ alternating current but arrange an inductive resistance, or resistances, in the alternating current circuit either in polyphase relation or in series or multiple, as may be necessary for the particular system of connections adopted. With this arrangement, at high speeds, the increased frequency and voltage of the current give rise to an increased inductive impedance so that there is a tendency to maintain a substantially constant braking effect with each set of connections established by the controller; while if more or less braking effect be desired, it is easily obtained by shifting the controller to decrease or increase the resistance as will be readily understood.

In general, the current for the excitation of the field of the machine or machines employed for braking will be obtained by a shunt field winding taking current from the commutator end of the armature which furnishes the alternating current for braking. At low speeds, however, this may not give a sufficient magnetization and I therefore arrange a field winding of larger wire which may have a regulating resistance in series with it, if found desirable. I may also, in the case of an electro-magnetic transmission employing two armatures, furnish the current for the field magnet of the braking armature from a source such as the armature of the other machine, as will be readily understood. The coil of the larger wire above mentioned may be in shunt relation to the circuit of the alternating current above mentioned. Such coils are usually called "series coils," on account of their resembling the series coil of a compound-wound generator or motor in their size and effect; and I so designate them in this case whether or not in series with the work. The arrangement just indicated furnishes an efficient braking arrangement for automobiles, because increased current in the series coil furnishes a sufficient number of ampere turns to keep up the field magnetization when the speed falls below a critical point.

There are many forms of switch which may be employed to effect the necessary connections. I have illustrated the switches merely diagrammatically for the purpose of illustrating an operative system.

The accompanying drawings show diagrammatically an illustrative arrangement embodying the invention. In the drawings, Figure 1 is a diagrammatic side elevation of an electric transmission with my improved braking arrangement applied thereto showing both a shunt and series arrangement of the field-magnet windings of the generator.

Figure 2 is a diagrammatic view of a cylindrical controller developed, which will effect the necessary combinations, and Figure 3 is a diagram of a polyphase arrangement of resistances.

I have not deemed it necessary to illustrate the forms of circuit changing mechanism commonly employed with the automobile transmission in which my invention is particularly useful, because any suitable arrangement may be employed.

Referring particularly to Figure 1, A is the shaft, of which $A^1$ is one of the cranks, B is the rotating field-magnet of the element which is generally called in these combinations the "generator"; as it may operate either as a motor or generator, it is correctly a "dynamo-electric machine"; $B^1$ is the armature thereof, and $B^2$ its commutator; $C^3$ is the field-magnet shunt coil of the "motor" or dynamo-electric machine which forms the other element in such a transmission. $C^2$ is a series field-magnet winding. Of this I have shown only the windings in a diagrammatic form. $C^1$ is the armature and 5 its commutator; $c$, $c^1$ are collector rings which connect with taps from the armature winding in a well-known way, in this particular instance spaced about 180 electrical degrees apart. D is a resistance, of which $D^1$ is the core, as it is preferable to employ a highly inductive form of resistance. Any suitable arrangement may be provided for adjusting the impedance. In the drawing an adjustable coil is illustrated. In circuit with the series field-magnet winding is a resistance G shown conventionally as adjustable to vary the output of the generator in the usual way.

When the speed is low, the field strength will be increased by coupling in this winding, $C^2$, which serves as a means for maintaining the field strength during low speed operation.

A switch H is indicated for effecting such changes of connections. When the magnetization is increased, the output increases so as to increase the load upon the armature, and thus the braking effect desired.

In Figure 2 I have shown a drum controller which may be used to vary the connections and the amount of braking resistance in circuit, it being understood of course that the greater the resistance in the circuit the less the braking effect, inasmuch as this cuts down the current output and diminishes the load upon the armature.

In the lower part of Figure 2 are shown the armature $C^1$, the series field coil $C^2$, shunt field coil $C^3$, and resistance G. The circuits and contacts are so arranged that in the first controller position the circuit including the armature $C^1$ and shunt coil $C^3$ is closed through the contacts 4 and 5 engaging the drum and the alternating current circuit is closed through the resistance D through the contacts 8 and 9 engaging the drum.

In the second and third controller positions successive portions of the resistance D are short-circuited as the contacts 7 and 6 engage the controller drum segment. In the fourth, fifth and sixth positions the armature circuit which includes the series feed coil $C^2$ is closed, first through the resistance G and then this resistance is short-circuited in two steps as the contacts 3, 2 and 1 engage the controller drum segment.

Of course, it is to be understood that there may be a greater number of steps with this arrangement, and that it is not imperative, although desirable, that the resistance G be an inductive one.

It will be noted that the arrangement described above uses the alternating and direct currents successively. At high speeds where the current generated by the armature might give rise to commutation difficulties if taken from the commutator as direct current and where ample voltage is available for field excitation, because of the high speed, alternating current is used. Where, however, because of lower speed no commutation difficulties are experienced and considerable braking current can be drawn from the commutator, field excitation is provided through the series coil and direct current is used in the braking circuit either alone or as a supplement to the alternating current as shown.

In Figure 3, I have shown the outline of a suitable form of resistance for a polyphase current arrangement, the construction of which will be obvious without further description.

Obviously variation in the manner of adapting the invention may be made by those skilled in the art.

I claim as my invention:

1. The method of braking a shaft carrying means arranged to deliver direct and alternating current having a field and an armature which comprises exciting the field in which the armature operates with direct current obtained from the armature, closing the alternating current circuit at relatively high speeds and at lower speeds closing the direct current circuit.

2. The method of braking a shaft carrying an armature arranged to deliver direct and alternating current which comprises exciting the field in which the armature operates with direct current obtained from the armature, closing the alternating current circuit at relatively high speeds and at lower speeds closing the direct current circuit through resistance.

3. The method of braking a shaft carrying means arranged to deliver direct and alternating current having a field and an armature which comprises exciting the field in which the armature operates with direct current obtained from the armature, closing the alternating current circuit through an impedance at relatively high speeds, and at lower speeds closing the direct current circuit through a series field.

4. The method of braking a shaft carrying means arranged to deliver direct and alternating current having a series and a shunt field which comprises delivering alternating current to an impedance with shunt field excitation supplemented by additional excitation by a series field supplied with current from the commutator.

5. The method of braking a shaft carrying an armature provided with both collector rings and a commutator rotating in a magnetic field which comprises delivering alternating current from the collector rings at high speeds while carrying an excitation from a shunt field and at lower speeds magnetizing from a series field and delivering direct current from the commutator.

6. The method of braking a shaft carrying an armature arranged to deliver direct and alternating current which comprises delivering alternating current from the armature to an impedance at relatively high speeds and at lower speeds delivering direct current therefrom to a resistance and at the same time supplementing the excitation of the field within which the armature operates.

7. The method of braking a shaft carrying an armature arranged to deliver direct and alternating current which comprises delivering alternating current from the armature at relatively high speeds and at lower speeds delivering direct current therefrom and at the same time supplementing the excitation of the field within which the armature operates.

In testimony whereof, I have signed my name to this specification this 27th day of October, 1920.

JUSTUS B. ENTZ.